United States Patent [19]

Yamazaki

[11] 4,428,121
[45] Jan. 31, 1984

[54] TEST INDICATOR
[75] Inventor: Kunio Yamazaki, Batho, Japan
[73] Assignee: Mitutoyo Mfg. Co., Ltd., Tokyo, Japan
[21] Appl. No.: 335,126
[22] Filed: Dec. 29, 1981
[30] Foreign Application Priority Data

Jan. 8, 1981 [JP] Japan .................................. 56-1084[U]

[51] Int. Cl.³ .............................................. G01B 3/22
[52] U.S. Cl. ................................................. 33/172 B
[58] Field of Search .......................... 33/172 R, 172 B

[56] References Cited

U.S. PATENT DOCUMENTS

| | | | |
|---|---|---|---|
| 1,649,197 | 11/1927 | Senchak | 33/172 B |
| 2,115,955 | 5/1938 | Johnson | 33/172 B |
| 2,129,311 | 9/1938 | Street | 33/172 B |
| 2,308,207 | 1/1943 | Reinhard | 33/172 B |
| 2,341,809 | 2/1944 | Pearson | 33/172 B |

FOREIGN PATENT DOCUMENTS 377111  6/1964  Switzerland ..................... 33/172 B

*Primary Examiner*—Willis Little
*Attorney, Agent, or Firm*—Flynn, Thiel, Boutell & Tanis

[57] ABSTRACT

A test indicator is disclosed wherein a rotational displacement value of a measuring element is enlarged and transmitted by a sector gear supported on a main body of the test indicator to an indicating device, and the aforesaid sector gear is urged in two rotational directions opposite to each other by two springs so that the sector gear can be held at the neutral position.

The two springs for urging the sector gear are previously differentiated in resiliency from each other so as to provide two springs, one being stronger and the other weaker in resiliency, and the stronger spring is abutted thereagainst with a spring-load finely adjusting means positionally adjustably supported on the main body of the test indicator in the urging direction of the spring from the side of resisting the resilient force of the spring, whereby this spring-load finely adjusting means is adjusted in its position to vary its resilient force, so that the sector gear can be adjusted in position.

6 Claims, 3 Drawing Figures

TEST INDICATOR

BACKGROUND OF THE INVENTION

1. Field of the Invention

This invention relates to test indicators wherein a rotational displacement value of a measuring element is enlarged by a sector gear supported on a main body of the test indicator and transmitted to and indicated by an indicating device, and particularly to improvements in a mechanism for holding the measuring element at a neutral position.

2. Description of the Prior Art

The conventional test indicators have been generally of such an arrangement that a rotational displacement value of a measuring element is enlarged and transmitted to a hand through a sector gear and a transmission mechanism having a gear train operationally associated with the sector gear, and the rotational displacement value of the measuring element is read by use of the hand and a dial plate.

In the test indicators of the type described, in order to make the rotational displacement values of the measuring element in the normal and opposite directions equal to each other, it is necessary to arrange that, when the measuring element is held at substantially the center (i.e., the neutral position) of the scope of rotation thereof, the hand indicates the zero position of the dial plate. Heretofore, in order to obtain such a zero adjustment as described above, it has been proposed that, by pulling the sector gear toward opposite sides by use of two even tension springs, or by urging the sector gear from opposite sides by two sheet springs having urging forces equivalent in value to each other (according to Japanese Utility Model Application No. 59348/80), the sector gear is positioned at substantially the center of the scope of rotation thereof, to thereby hold the measuring element at a neutral position.

Nevertheless, even for the use of the even tension springs or the even-urging sheet springs, these springs have variabilities in resiliency to some extent and urging forces rendered to the sector gear by these springs are varied depending on the assembled conditions, thereby presenting the disadvantage that difficulties are encountered in achieving the adjustment described above.

SUMMARY OF THE INVENTION

The present invention has as its object the provision of a test indicator wherein adjustment of holding a measuring element at a neutral position is facilitated.

The present invention contemplates that two springs for holding the sector gear at the neutral position are previously differentiated in resiliency from each other so as to provide two springs, one being stronger and the other weaker in resiliency, and the stronger spring is abutted thereagainst with a tip end of a spring-load finely adjusting device positionally adjustably supported on the main body of the test indicator in the urging direction of the spring at the side of resisting the resilient force of the spring, whereby the spring-load finely adjusting device is adjusted in its position to carry out fine adjustment in bringing the sector gear to the neutral position, so that a hand can be readily registered with a zero position of a dial plate, thereby enabling the abovedescribed object to be achieved.

DETAILED DESCRIPTION OF THE PREFERRED EMBODIMENT

Figure 1:
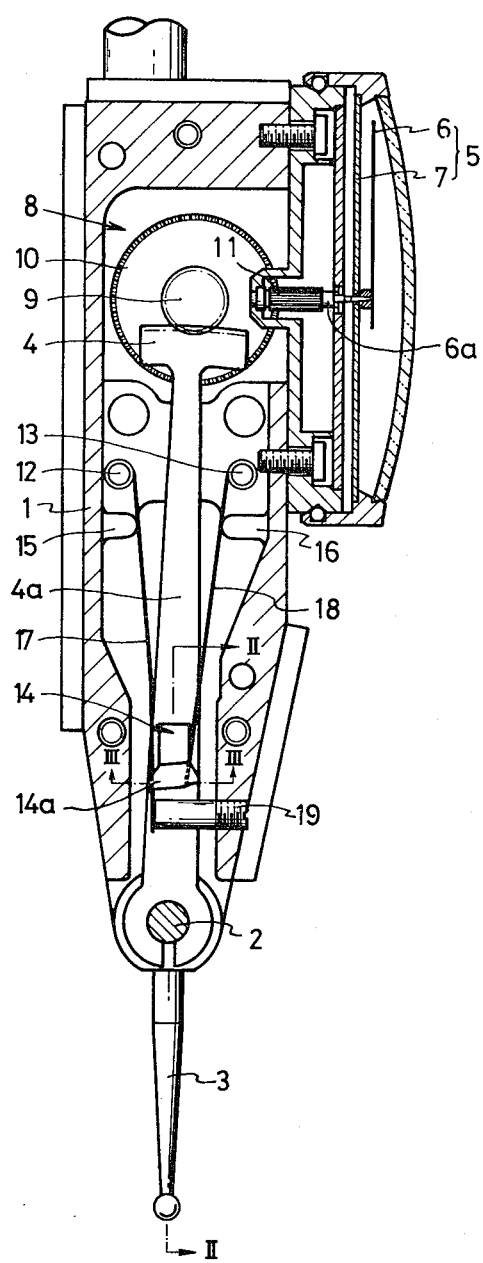
FIG. 1 is a sectional view of an embodiment of the test indicator according to the present invention.

Referring to FIG. 1, a main body or frame 1 is formed of a one-piece box-like form by aluminum die casting or the like, and a shaft 2 is secured to the forward end portion of this main body 1. One end of a measuring element 3 (the upper end in the drawing) is rotatably supported on the shaft 2, and one end (the lower end in the drawing) of the sector gear 4 is also rotatably supported on the shaft 2. The measuring element 3 and the sector gear 4 are brought into press contact with each other through a spring washer, not shown. With the above arrangement, a frictional force is generated between the press contact portions of the measuring element 3 and the sector gear 4, so that the sector gear 4 can integrally rotate with the measuring element 3 due to the frictional force.

Provided at the front surface of the aforesaid main body 1 is an indicating device 5, which functions to indicate a rotational displacement value of the measuring element 3, and includes: a hand 6 rotatably supported on the main body 1 through a hand shaft 6a; and a dial plate 7 held on the main body 1. This hand 6 is operationally associated with the measuring element 3 through the sector gear 4 and a transmission mechanism 8 having a gear train. This gear transmission mechanism 8 is rotatably supported on the main body 1, and includes: a pinion 9 meshed with the sector gear 4; a crown gear 10 integrally formed on the pinion gear 9; and a pinion 11 integrally formed on the hand shaft 6a and meshed with the crown gear 10.

Figure 2:
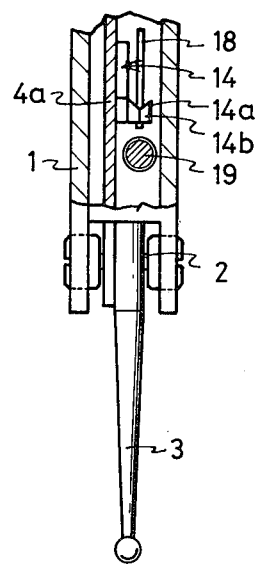
FIG. 2 is a sectional view taken along the line II—II in FIG. 1.
Figure 3:
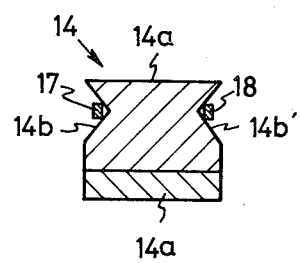
FIG. 3 is a sectional view taken along the line III—III in FIG. 1.

Solidly mounted in the main body 1 are a pair of spring-engaging pins 12 and 13, which are spaced apart from each other and disposed at opposite sides of an intermediate arm portion 4a of the sector gear 4. A spring-engaging device 14, being a spring-engaging portion, is affixed to a portion of the intermediate arm portion 4a at the side of the shaft 2. As shown in FIGS. 2 and 3, this spring-engaging device 14 has a projection 14a which is provided at opposite sides thereof with substantially V-shaped engageable grooves 14b and 14b'.

In the main body 1, projections 15 and 16 project from the main body 1 at positions adjacent to the aforesaid pins 12 and 13, and respective ends of sheet or leaf springs 17 and 18 are wound around and supported by the pins 12 and 13, respectively. These sheet springs 17 and 18 abut at the intermediate portions thereof against the projections 15 and 16, and are brought into press contact at the other ends thereof with the engageable grooves 14b and 14b' of the spring-engaging device 14. These sheet springs 17 and 18 resiliently urge the spring-engaging device 14 and the sector gear 4, so that the spring-engaging device 14 and the sector gear 4 are rotated about the shaft 2 of the sector gear 4 in the directions opposite to each other.

One 17 of the sheet springs is set in resiliency at a value slightly larger than the other 18 of the sheet springs, and part of the forward end portion of the sheet spring 17 projects from the spring-engaging device 14 toward the shaft 2. As shown in FIG. 1, the forward end portion of a screw 19 acting as a spring-load finely adjusting device abuts against the forward end portion of the sheet spring 17 from the side of resisting the resilient force of the sheet spring 17. This screw 19 is threadably coupled to the main body 1 in a manner to be linearly adjustable in the direction of resisting the resilient force of the sheet spring 17. As a consequence, when the screw 19 is linearly adjusted to finely adjust the neutral position of the sector gear 4, the hand 6 operationally associated with the sector gear 4 rotates, so that zero adjustment of the hand 6 can be carried out.

As has been described hereinabove, in this embodiment, the stronger one in resiliency out of two sheet springs 17 and 18 for holding the sector gear 4 in the neutral position is abutted thereagainst with the forward end of the screw 19 threadedly coupled to the main body 1 in a manner to be adjustable in the urging direction of the spring from the side of resisting the resilient force of the spring, whereby the fine adjustment of the sector gear 4 in the neutral position is quickly and simply carried out, so that the hand 6 can be readily registered with the zero position in the graduation of the dial plate 7.

In addition, in the embodiment described above, the spring-engaging device 14 is formed separately of the sector gear 4 and provided with the V-shaped engageable grooves 14b and 14b', however, the present invention is not limited to this specific construction, but the spring-engaging portion may be a projection integrally formed on the sector gear 4 or a mere pin. In short, any construction engageable with the springs 17 and 18 may be sufficient. However, the provision of the engageable grooves 14b and 14b' is advantageous in that the springs 17 and 18 are positively engaged therewith. Additionally, the springs 17 and 18 need not necessarily be the sheet springs, but may be wire springs. However, the provision of the sheet springs is advantageous in that the forward end portion of the spring 17 can be positively abutted against the forward end of the screw 19.

Further, in the embodiment described above, the screw 19 threadably coupled to the main body 1 has been explained as being the spring-load finely adjusting device, however, the screw 19 may be replaced by an eccentric cam or the like as the spring-load finely adjusting device. In the use of this eccentric cam, the eccentric outer periphery thereof is abutted against the forward end portion of the sheet spring 17 and rotated, whereby the eccentric cam is varied in the value of eccentricity at the side thereof abutting the sheet spring 17, so that the spring load can be finely adjusted. Furthermore, the portion of this spring-load finely adjusting device which abuts against the spring need not necessarily be the forward end portion, but may be the intermediate portion. However, the use of the forward end portion is advantageous in that the installation of the spring-load finely adjusting device is facilitated.

What is claimed is:

1. A test indicator wherein a rotational displacement value of a measuring element is enlarged by a sector gear rotatably supported on a main body of said test indicator and transmitted to an indicating device, wherein the improvement comprises:
    a spring-engaging portion provided on said sector gear;
    a pair of springs each resiliently engaging said spring-engaging portion of said sector gear, said springs being different in resilient force from each other and being positioned so as to urge said sector gear for rotation in opposite directions respectively; and
    spring-load fine adjustment means positionally adjustably supported on said main body in abutting relation with the one of said springs having the strongest resilient force, in the urging direction of said spring having the strongest resilient force and at the side thereof so as to resist the resilient force of said spring having the strongest resilient force.

2. A test indicator as set forth in claim 1, wherein said springs are sheet springs.

3. A test indicator as set forth in claim 1 or claim 2, wherein said spring-engaging portion has two V-shaped engageable grooves which open in opposite directions, with which said springs are respectively engaged at the bottom of said engageble grooves.

4. A test indicator wherein a rotational displacement value of a measuring element is enlarged by a sector gear rotatably supported on a main body of said test indicator and transmitted to an indicating device, wherein the improvement comprises:
    a spring-engaging portion provided on said sector gear;
    a pair of sheet springs each resiliently engaging said spring-engaging portion of said sector gear, said sheet springs being different in resilient force from each other and being positioned so as to urge said sector gear for rotation in opposite directions respectively; and
    a screw linearly, adjustably and threadedly coupled to said main body in abutting relation with the one of said sheet springs having the strongest resilient force, in the urging direction of said sheet spring having the strongest resilient force and at the side thereof so as to resist the resilient force of said sheet spring having the strongest resilient force.

5. In a test indicator including a frame, a measuring element rotatably mounted on said frame, a sector gear having an elongated arm portion thereon, said sector gear being mounted on said frame at said arm portion thereof for integral rotation with said measuring element, and an indicating device functionally connected to said sector gear for measuring rotational displacement of said measuring element from a neutral starting position, the improvement which comprises:
    a pair of first and second springs mounted on said frame at opposite sides of said arm portion of said sector gear such that said springs resiliently urge said sector gear and said measuring element to said neutral position, said first spring being capable of exerting a greater resilient force on said arm portion of said sector gear than said second spring; and
    abutting means adjustably secured to said frame for abutting against said first spring in such a manner that the resilient force exerted by said first spring on said arm portion of said sector gear can be adjusted in response to changes in the position of abutment of said first spring with said abutting means, whereby said neutral position can be adjusted to correspond to a neutral position value indicated by said indicating device.

6. A test indicator as claimed in claim 5, wherein said abutting means is a screw threadedly adjustably secured to said frame, said screw having a flat forward end which abuts against said first spring.

* * * * *